Sheet 1-2, Sheets.
W. Humiston.
Candle Mold.
No. 2,190. Reissued Mar. 6, 1866.
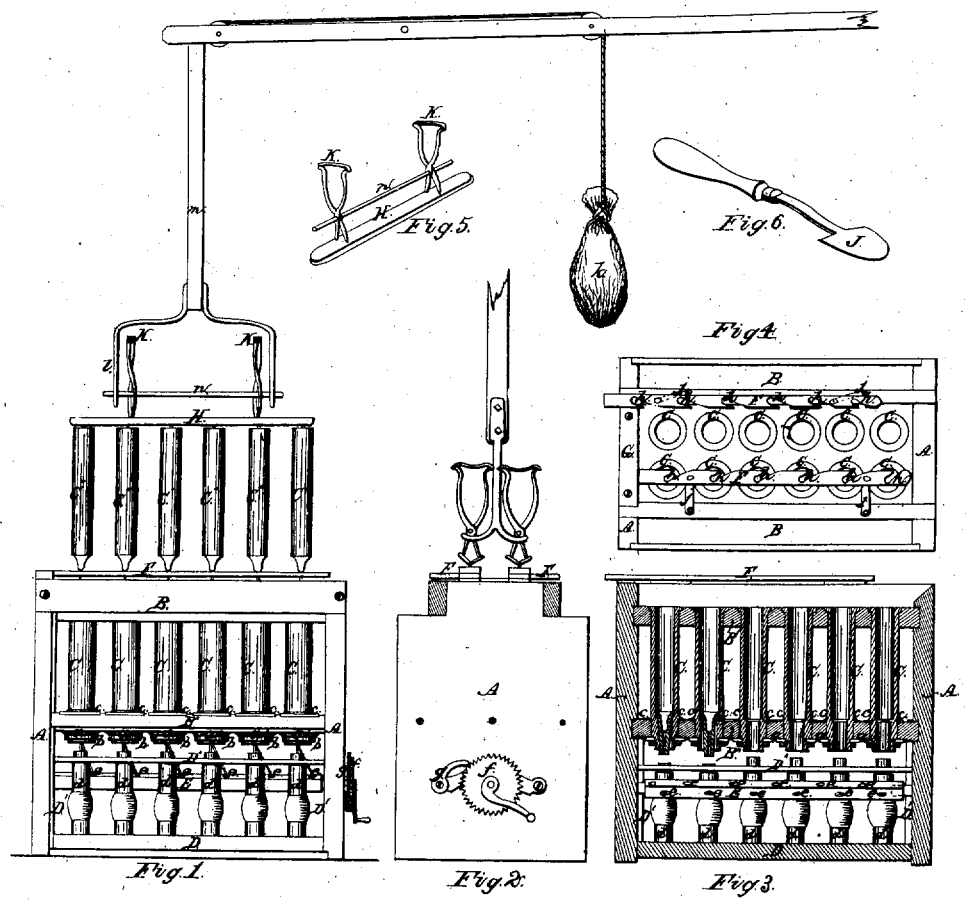
Witnesses:
Charles D. Velleme
R. D. Rielle
Inventor:
Willis Humiston Sheet 2-2 Sheets.
W. Hunniston.
Candle Mold.
No. 2,190. Reissued Mar. 6, 1866.
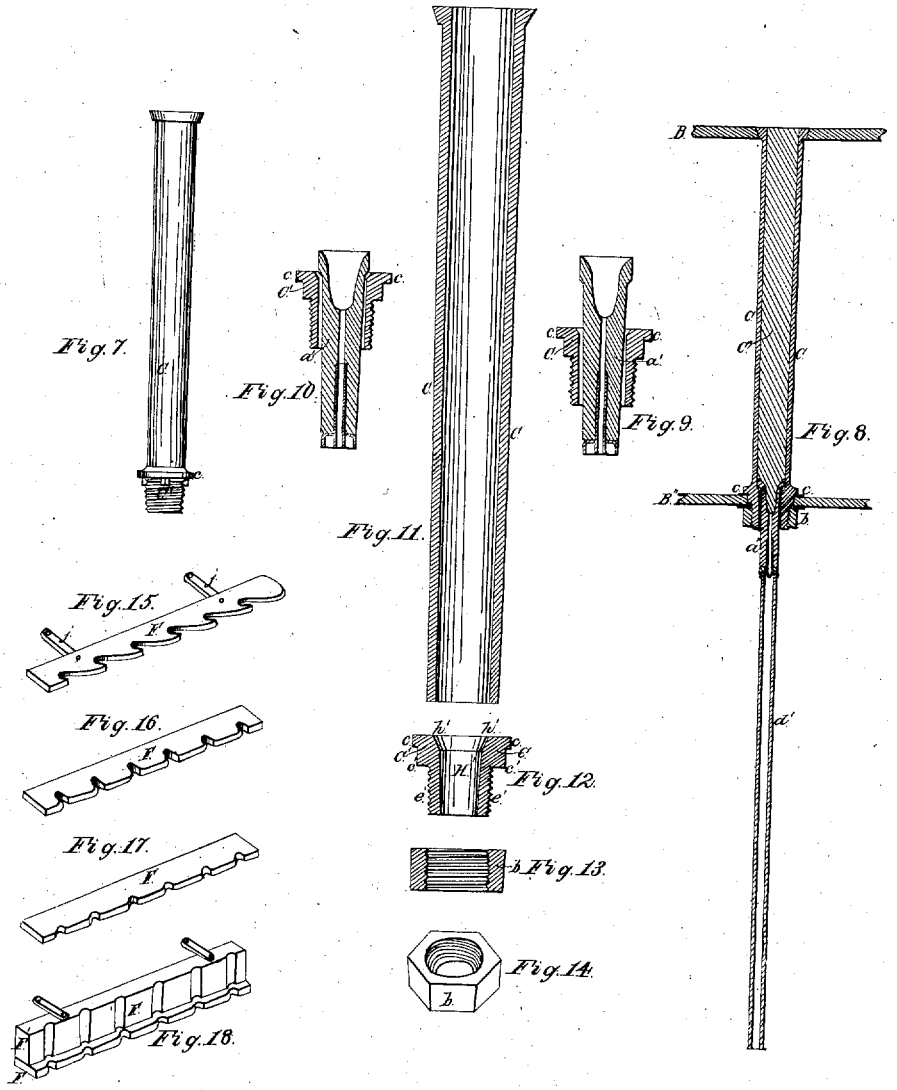
Witnesses:
Charles D. Kellum
R. W. Reille
Inventor:
Willis Hunniston

UNITED STATES PATENT OFFICE.

WILLIS HUMISTON, OF TROY, NEW YORK.

IMPROVED APPARATUS FOR MOLDING CANDLES.

Specification forming part of Letters Patent No. 10,730, dated April 4, 1854; Reissue No. 2,190, dated March, 6, 1866.

*To all whom it may concern:*

Be it known that I, WILLIS HUMISTON, of the city of Troy, county of Rensselaer, and State of New York, did, on or about the 4th day of April, A. D., 1854, obtain of and from the United States of America certain Letters Patent for and upon new and useful Improvements in Candle-Mold Apparatus or Machine, and bearing the title of "Improvement in Candle-Mold Apparatus," which said Letters Patent I now surrender, as by the law provided, for the only purpose of correcting, amending, and reforming the said Letters Patent, and the specifications, drawings, and claims thereof, so as to more fully bring out and make known my aforesaid named invention; and to enable me to a better and more full protection of my rights in, to, and for the said invention and improvements, I do hereby declare the following to be a full, clear, and more exact description of my said invention and improvements, reference being hereby had to the accompanying drawings, and to the letters of reference marked thereon, which said drawings make a part of this specification.

Like letters represent and refer to like or corresponding parts.

For the purpose of a more full, correct, and perfect representation of my said invention by and from drawings, I have prepared two sheets, which I denominate Sheet 1 and Sheet 2.

Figure 1, Sheet 1, is a side elevation showing the suspended candles drawn from the vertical stationary candle-molds, and the means of doing the same, substantially as hereinafter described and set forth. Fig. 2 is an end elevation of the machine, and showing the manner of the drawing of the candles from the vertical stationary candle-molds by the means substantially as herein described and set forth. Fig. 3 is a vertical section taken on a line through the center of the vertical stationary candle molds, constructed and arranged substantially as and for the purposes herein described and set forth. Fig. 4 is a top view of the machine, showing the upper end of the vertical stationary candle-molds, and the centering, supporting, and candle-tip bar, constructed, arranged, and operating substantially as and for the purposes herein described and set forth. Fig. 5 is a detached perspective view of one of the nippers used in drawing the candles from the vertical stationary candle-molds. Fig. 6 is a perspective view of the wick-cutter. Fig. 7, Sheet 2, is a side view of the vertical stationary candle-molds, and the device or attachment at the lower ends thereof having nut and screw, and also an exterior shoulder, each constructed, arranged, and combined in the manner and for the purposes substantially as hereinafter described and set forth. This figure shows such devices at a reduced size from those required in actual use, or, in other words, upon a reduced scale from those shown at Figs. 11 and 12, same sheet. Fig. 8 shows a vertical section of the stationary candle-molds on a center line, and attached to the machine water-box frame, with the aforesaid lower end device or attachment therewith combined, also nut and screw, also the candle-tip mold combined with the piston or ejecting rod, and patented to me on the 24th day of July, A. D. 1855, and reissued, bearing date January 22, 1861, and again on the 14th day of November, A. D. 1865, upon improvements in candle-machines, and to which reference is hereby had. The devices shown by this figure are upon the same scale as those at Fig. 7, aforesaid. Fig. 9 is a vertical section on a center line of the device, combined with the lower end of the said vertical stationary candle-molds, and having a screw and exterior shoulder, and also forming an internal shoulder at or near the lower end of aforesaid candle-molds, each for the purposes substantially as herein described and set forth. It also shows the candle-tip mold, which is combined with the piston or ejecting rod in the manner and for the purposes substantially as specified and set forth in my aforesaid Letters Patent. Fig. 10 shows the same devices as are shown at the said Fig. 9, with the exception that the said candle-tip mold is shown dropped down and upon the inner shoulder of the said lower device, combined with said vertical candle-mold, and for the purposes substantially as herein described and set forth. Fig. 11 is a full-size vertical stationary candle-mold on a vertical line through the center and showing the lower end thereof before the device with internal and external shoulders, hereinafter described, and with nut and screw, is combined therewith by means and for the purposes substantially as herein described and set forth, and which device is seen in full size at Fig. 12; also, nut at Figs. 13 and 14, and each constructed substantially as shown and hereinafter described and set forth. Fig. 15 is a perspective view of the candle-tip bar constructed with recesses for the tips of the candles on an angle, and more fully hereinafter described and set forth. Fig. 16 is also a perspective view of the said candle-tip bar, and showing the recesses at right angles with the bar itself to receive and support the tips of the candles, for the purposes substantially as hereinafter described and set forth and is but a modification of my said candle-tip bar. Fig. 17 is also a perspective view of the said candle tip bar, showing small recesses for the tips of the candles, and is but another modification of my said candle-tip bar used for the purposes substantially as hereinafter described and set forth.

There are other modifications of the said candle-tip bar which I do not deem essential to describe in the drawings accompanying this specification.

The nature of my said invention and improvements consists in the employment of a wick-stretcher so constructed and arranged as to remove the strain or friction upon the wicks before the candles are drawn or ejected from the vertical stationary candle-molds, as hereinafter described and set forth.

It also consists in the employment of a candle-tip bar arranged over and above the top of the vertical stationary candle-molds, and so constructed and combined as to receive the tips of the candles, and thereby center the wick for the next set or series of candles to be molded in the said molds below, and at the same time support the candles suspended above said vertical stationary molds by means of the tips of said candles resting against and upon the said tip-bar, which is moved or swung thereunder in a lateral direction immediately after said candles have been removed from said vertical stationary candle-molds, by being drawn therefrom or ejected therefrom by means of a tip-mold and piston or ejection rod combined, substantially as specified and set forth in my said Letters Patent, dated as aforesaid, on the 24th day of July, A. D. 1855, and reissued on the 22d day of January, A. D. 1861, and also on the 14th day of November, A. D. 1865, as aforesaid, and in the manner substantially as here in described and set forth.

It also consists in the employment of a vertical stationary candle-mold so constructed at its lower or candle-tip end as to form a shoulder upon the inner part thereof for the purpose of receiving and supporting a candle-tip mold, or any equivalent therefor, and thereby and by means thereof prevent any of the melted tallow from escaping from the said vertical stationary candle molds before the same shall become cooled and formed into a candle, in the manner substantially as herein described and set forth, while at the same time a shoulder shall be formed upon and around the outside part of the said stationary candle-molds at or near the lower ends thereof, so that the same shall rest upon the frame or lower part of the water-box, and receive a nut and screw upon the under side or part of such water-box and upon the lower end of such vertical stationary candle-mold so as to make a water-tight joint where the lower end of the said stationary candle-mold passes through such part or bottom of the said water-box surrounding the said stationary candle-molds, in the manner and by the means substantially as herein described and set forth.

The improvements in candle-mold machines patented to me on the 24th day of July, A. D. 1855, and twice reissued, as aforesaid, were improvements made by me upon the machine for molding candles, and patented April 4, 1854, which Letters Patent I now ask to reissue upon these corrected, amended, and reformed specifications, drawings, and claims, as aforesaid.

By means of the invention and improvements described, set forth, and claimed in the aforesaid Letters Patent, and by means of the invention and improvements specified, set forth, and claimed in this application for reissue of my said Letters Patent, dated as aforesaid—to wit, April 4, 1854—I am enabled to manufacture for and furnish to the market a candle-machine in and by which perfect and marketable candles may be made in large quantities at one operation of the machine, and which machine may be rapidly operated or worked in succession, and during almost any season of the year or in any climate, without waste of candle-wick or of any of the material of or from which the candles are made, substantially as herein and therein specified, and with due reference to my aforesaid last reissued Letters Patent, as well as to the improvements herein described and set forth, as before stated.

Having thus described the nature of my said invention and improvements contained in my said Letters Patent, dated April 4, 1854, and to enable persons skilled in the art to which my said invention and improvements relate to make and use the same, I will here proceed to describe the construction and operation thereof, which is as follows, to wit:

A A are the end parts of the frame, arranged in a vertical position. B B″ are horizontal portions of the frame, connected to and with said vertical end parts in any good and substantial manner, and which receive and hold the vertical stationary candle-molds C C. The upper one, B, of the said horizontal parts of the said frame also forms the lower part of the trough or reservior immediately over and surrounding the upper portions of said vertical stationary candle-mould, and which also receives and holds the said upper ends of said candle-molds, substantially as hereinafter described as well as shown at Fig. 4 Sheet, 1. The lower ends of the said vertical stationary candle-molds extend down and entirely through the lower plate or frame, B″, substantially as shown at Figs. 1 and 3. The outer shoulder, *c*, Figs. 1 and 3, rests upon the packing shown by red lines at same figures, which I usually make of sheet-lead, which from long experience I have found to be the best material to contribute to the making of a water-tight joint where the lower end of the said vertical stationary candle-mold passes through the bottom plate, B″, of said water-box, surrounding said vertical stationary candle-mold, as aforesaid. The said sheet-lead packing, of course, is put upon the said bottom plate and then the immediate lower end of said candle-mold passes through the same and through the said bottom plate of the said water-box, and then I put upon the under side of the said bottom plate of said water-box the washer shown by red lines at said Figs. 1 and 8, which I prefer to make of sheet-tin, and which is for the simple and only purpose of a washer. I then put on the nut *b*. (Seen at the different figures of both Sheets 1 and 2 of the drawings.) I turn the said nut firmly upon the said washer, by means of which the said shoulder *c*, Figs. 1 and 3, Sheet 1, and Figs. 7, 8, 9, 10, and 12, Sheet 2, is drawn down firmly upon the said packing and upon the said bottom plate of the said water-box, and thus and thereby make a complete and perfect water-tight joint where said lower end of the said vertical stationary candle-mold passes through said bottom plate, B″, substantially as aforesaid. The said nut and screw may be of any size or strength deemed best, and I usually make them of the same material that I make the said vertical stationary candle-molds of or from. It will therefore be seen that by means of the said packing, washer, and nut on the lower end of the said vertical stationary candle-mold, and by the drawing of the said shoulder *c* on the mold down to and upon the said packing and bottom plate; as aforesaid, the water from the melted ice or otherwise put into said water-box surrounding said stationary candle-molds is prevented from leaking through and wetting the candle-wicking below or from otherwise injuring the successful working of the said candle-machine.

D and D are the frame-pieces containing the wick-tightener E and the wick-bobbins *d d*. This frame is made so as to slide in snugly between the end frames, A A. The said wick-tightener is a shaft which extends across the frame or machine lengthwise of the same, and contains as many holes *e e* through it at right angles to each other, as there are vertical stationary candle-molds in the machine. One of the journals of the said wick-tightener passes through the end frame, A, and has there attached to it the ratchet-wheel *f* with the catch or pawl *g*, and being for the purpose of keeping the candle-wick tightener set or fixed in any required or desired position during the operation of the machine.

The candle-tip bar F, Figs. 1 and 4, Sheet 1, and Figs. 15, 16, and 17, Sheet 2, is for the purpose of receiving the candles C″, Fig. 1, Sheet 1, at their tips or lower ends, and thus and thereby support the same after having centered the wick in the stationary candle-molds below for the next set or series of candles to be molded, while at the same time the said candles molded and drawn or ejected from the said stationary candle-molds remain suspended above with their respective tips resting upon and against the said candle-tip bar F, or the equivalent therefor, as aforesaid, and thus and thereby hold and support the said candles without any injury to the tips or body thereof during the operation of making said candles, as aforesaid. The said candle-tip bar is so constructed and arranged as to be moved in a lateral direction from and toward the top of the said vertical stationary candle-molds as follows—to wit: First, it must be moved in a lateral direction from the said vertical stationary candle-molds, so as to allow the candles to be drawn or ejected from the molds below, in which they were molded, into receiving and supporting bars above, constructed and arranged substantially as specified and set forth in the last reissue of my aforesaid named Letters Patent, or drawn therefrom by the means substantially as shown at Fig. 1 of Sheet 1, of the accompanying drawings; and second, when the said candles are thus drawn or ejected from the said molds and above the top of the said vertical stationary candle-molds and in proper condition for the centering of the candle-wick and for the severing of the candle-wick, as hereinafter set forth, then the said candle-tip bar must be moved in a lateral direction toward the said vertical stationary candle-molds and suspended candles, and up to, under, or against the tip or lower end of the candles thus drawn or ejected and suspended, by means of which the wick for the candles next to be molded is centered and the candles held and supported during the operation of the molding of the candles in said vertical stationary candle-molds and the severing of the wick between the suspended candles and the candles in the said molds by the means of the said candle-tip bar. The said candle-tip bar may be constructed substantially as shown at Figs. 15, 16, and 17 of the drawings, Sheet 2, or in any other good and substantial manner which will answer the purposes herein described and set forth.

There will be one such tip bar for each row of vertical stationary candle-molds, and it may be made of metal, wood, or rubber, or from such other material as shall not injure the tips of the candles while receiving and supporting the same, substantially as aforesaid. Each will extend lengthwise of the candle-machine and entirely across the same. In this bar may be made the centering or candle-tip-receiving recesses *h h*, Fig. 4, Sheet 1, and Figs. 15, 16, and 17, Sheet 2, and one for each candle-tip or vertical stationary candle-mold It may be attached to the vibrating arms *j* and may be so adjusted that when the end is against the stop G then the said recesses *h h* are directly over the center of the said stationary candle-molds. It may also be so arranged as to center the candle-wick, as aforesaid, and to hold or support the candles by means of the tips or lower ends of the same coming in contact with said tip-bar in the manner substantially as aforesaid by means of slides, instead of the said arms *j j*, Fig. 4, Sheet 1; or the said tip-bar may be attached to or combined with another bar arranged on a vertical line over the said stationary candle-molds, and so constructed as to open laterally on such vertical line lengthwise with the candle-machine or row of candle-molds therein. If combined with such vertical bar it will be upon the immediate lower edge thereof, by means of which the said tip-bar would be moved to the right or to the left laterally, and when the candles are drawn or ejected from said molds below for the purpose of centering the wick for the next set of candles to be molded in said stationary candle-moulds, and for the purpose of holding the candles thus suspended while the wick is being cut or severed between the candles thus drawn or ejected and the candles in the said molds below, the said tip-bar is moved up in a lateral direction under and against the tips of the said candles, so as to seize the same and hold such candles suspended over said stationary molds, for the purposes aforesaid. The movement of the said vertical and auxiliary bar, to which the said candle-tip bar is attached and combined, as aforesaid, will of course move the said tip-bar in a lateral direction to or from the said vertical stationary candle-molds or to, against, or under the tips of the candles drawn or ejected from the said molds, as aforesaid. If the said tip-bar is thus combined with the said vertical bar it will be in the manner substantially as shown at Fig. 18, Sheet 2 of the drawings, which said vertical bar will extend the full length of the candle-machine, and each end thereof will rest upon the respective ends and top surface of the trough or reservoir surrounding the immediate top or upper end of said stationary candle-molds. This would only be a modification of my said invention in candle-tip-supporting bar operating in a lateral direction in the manner and for the purposes substantially as aforesaid. When the candles are ejected from the said mold, substantially as described and set forth in my said last reissue of my said Letters Patent granted to me on or about the 24th day of July, A. D. 1855, the said tip-bar may be constructed without any recesses in the immediate edge of the same, as there will be recesses in the side of the said vertical auxiliary bar named aforesaid, all of which are but modifications of my said new and improved candle-tip bar constructed and arranged so as to come in contact with the tip of the candles, receive and support the same for the purpose of centering the wick in the said stationary candle-molds below, and while the said wick is being cut or severed between the candles thus suspended and held and the candles in the molds below, as aforesaid, and at the same time allow the said tip-bar to be moved in a lateral direction, so as to allow the candles to be drawn or ejected vertically from said molds, and then when the same are thus put in proper position above and over the said molds below, to permit said tip-bar to be moved laterally up to, under, and against the tips or lower ends of the said candles thus drawn or ejected from said molds, for the purposes substantially as aforesaid and during the operations substantially as aforesaid. The said candle-tip bar F is hinged to the candle-machine frame by means of the hinges *j j*, Fig. 4, Sheet 1, and Fig. 15, Sheet 2, or any equivalents therefor, by means of which the said candle-tip bar is moved up to, against, or under the tips of the candles in a lateral direction, so as to seize and hold the candles at or near their respective tip-ends so as to center the wick in the said molds below, and during the cutting or severing of the wick, substantially as aforesaid. In case the vertical or auxiliary bar F′, Fig. 18, is used with the said tip-bar F, both bars may be so constructed as to be moved in a lateral direction for the purposes aforesaid. In that case the respective ends of the said bar F′ will rest upon the top of the reservoir or trough hereinbefore described, while the said candle-tip bar may be hinged to the under part or edge of the said bar F′ in such manner that it may be swung or moved in a lateral direction, for the purposes aforesaid, or both may be so moved jointly. There are other modifications of the construction and arrangement of the said tip-bar, and which I do not deem essential or material to herein describe, as the main or real object or purpose of my said tip-bar I have hereinbefore fully described and set forth.

The nippers H for drawing the candles from said molds have their jaws tightened and set onto the wick by means of the spring-catches K K, placed at or near the ends of the handles, which arrangement gives the great advantage of leverage and a much firmer grip on the jaws. When the candles are ejected from the said molds, instead of being drawn therefrom by the means above mentioned, I use the device of candle-tip mold *a′*, and piston or ejecting rod *d′*, Fig. 8, Sheet 2, of accompanying drawings, and which so combined were patented to me as aforesaid at the date aforesaid. The said candle tip mold so patented to me may also be seen at *a′*, Figs. 9 and 10, same sheet, and is at large described and set forth in my said last reissue of my said Letters Patent, as is also the said piston or ejecting rod *d′*, each of which constitute no part of the invention sought to be patened in or by this specification, and need not be specifically herein described more than to show the application of the said device so constructed, combined, and operated to my improvements in vertical stationary candle-molds, herein described and set forth, and which may also be seen at Figs. 8, 9, and 10, Sheet 2 of the accompanying drawings.

At Fig. 12, Sheet 2, may be seen in full size the lower part or attachment of the said vertical stationary candle-mold, and which is there marked C′. This device or attachment is constructed with an outer shoulder, *c c*, same figure, and also seen at Figs. 7, 8, 9, and 10, same sheet. This shoulder extends entirely around the circumference of the said stationary candle-mold, and may be of any form or size deemed best to use to the purposes aforesaid. A square corner, *c′*, same figure, may be seen, which is for the purpose of holding the said mold in the said bottom plate of the said water-box while the nut *b*, Figs. 13 and 14, is being put thereon and screwed upon and against the said washer upon the under side of the said bottom plate, B″, of said water-box, and thereby prevent said stationary candle-molds from turning round at such time. I then construct a screw, *e′*, upon the lower part of said device, as seen at Fig. 12, also Figs. 7, 8, 9, and 10, Sheet 2. I construct the opening H′, Fig. 12, Sheet 2, through the entire length of said device or attachment, and of sufficient size to allow the use of the said candle tip mold *a′* and piston or ejecting rod *d′* to operate therein, substantially as aforesaid and as shown at said Figs. 8, 9, and 10. At the upper end of the said tube or opening H, Fig. 12, I construct the aforesaid inner shoulder, *h′ h′*, same figure, which may be of any form or shape deemed best to use and of any required capacity, for the purposes substantially as aforesaid.

This device thus constructed will appear in form or shape substantially as shown at Figs. 9, 10, and 12, Sheet 2 of the accompanying drawings. After being thus constructed I attach or combine the same with the lower end of said vertical stationary candle-mold by means and use of solder, which, thus united, will be in form and appearance substantially the same as shown at Figs. 7 and 8, Sheet 2, and when in the machine ready for use will be substantially as shown at Figs. 1 and 3, Sheet 1 of accompanying drawings. The said device *e′ e′*, Fig. 12, may also be made at the same time and with the casting of the said stationary candle-mold seen at Fig. 11, same sheet, but I prefer to cast it separate and then solder it upon the lower end of the said stationary mold as aforesaid. The upper part of the inner shoulder, *h′ h′*, Fig. 12, I usually make in diameter of the size of the lower end of the candle-mold in which the candle is molded, and then the said tube or opening H, being of less diameter than the tube or opening in said stationary candle-mold, the required shoulder will be formed, substantially as and for the purposes aforesaid. The said inner shoulder will prevent the said candle-tip mold *a′* from being drawn out or from the said stationary candle-mold when said mold is being put in readiness to mold a candle with a tip thereon, and also prevent any tallow or other material from escaping from said vertical stationary candle-molds during the operation of molding of the candles, substantially as aforesaid, and is therefore of great utility and importance in the successful molding of candles, as aforesaid. The said nut *b*, Figs 8, 13, and 14 of Sheet 2, may be of any size or shape deemed best to use. When this part of my said invention is put into practical use it will be and will appear substantially as shown and seen at Fig. 8, Sheet 2, and Figs. 1 and 3 of Sheet 1, as aforesaid stated. The said device *e′ e′* I usually cast in molds constructed for that special purpose, by means of which the said screw *e′*, outer shoulder, *c*, square *c′*, tube or opening H′, and the inner shoulder, *h′ h′*, Fig. 12, are cast for the purposes aforesaid.

The bobbins being supplied with wicking and set in their proper positions in the bobbin-frame, the end of the wick from each bobbin is then passed through its respective hole in the wick-tightener, and then passes up through the candle-molds, when they are gripped by the nippers, and the double hooks *l l*, attached to the rod *m*, are hooked onto the nipper-shaft *n* of each nipper, then drawn up by means of the end passing over the pulleys in the beam *o* and attached to the weight *p*, and the aforsaid candle tip bar F, being swung or moved in a lateral direction up to, against, or under the tips of the candles, substantially as shown at Fig. 1, Sheet 1, and the wick passing through said vertical stationary candle-molds being somewhat tightened by the aforesaid shaft E, or by means of the passing downward of the candle-tip mold *a′* with the wick passing through the center of the same, substantially as described and set forth in the last reissue of my aforesaid patent, originally granted on the 24th day of July, 1855, and hereinbefore referred to, the said wick will then and thus be accurately centered and ready for the pouring of the tallow into the said vertical stationary candle-molds, which being done, ice, water, or snow may be placed in the said water-box surrounding the said vertical stationary candle-molds, for the purpose of cooling the melted and poured tallow or other candle material in the said molds, so as thereby to cool the same sufficiently to enable the candles to be drawn from the said molds in a vertical direction, or they may be ejected therefrom in the same direction by means of the said candle-tip mold *a′* and pistons or ejecting rods *d′*, and which is fully described and set forth in the last reissue of my said Letters Patent aforesaid and of the dates aforesaid. The candles first drawn or ejected can be removed from the machine and from the said candle-tip bar by cutting or severing the wick by passing the shovel-blade cutter J between the wick of the rows of candles and upon the upper surface of the plate B, which, as aforesaid, forms the bottom of the aforesaid trough or reservoir and, of course, over the immediate upper end of the said vertical stationary molds. After the wick is thus cut the superfluous tallow remaining upon the bottom of the said trough or reservoir may be scraped off, when the candles thus molded in the said stationary candle-molds are ready to be drawn or ejected therefrom in a vertical direction, substantially as aforesaid, and so the operation of the making of candles continues to any desired length of time, each and every part of the aforesaid described machine working and operating in the manner and for the purposes substantially as aforesaid.

Having thus described the nature, construction, and operation of my said invention and improvements in candle-mold machines, what I claim, and desire to secure by Letters Patent of the United States of America, is—

1. The employment of the wick-stretcher E, so arranged and combined with the machine having vertical stationary candle-molds therein that the candle-wick within such molds shall be uniformly stretched or strained before the material is run or poured into such molds, and the friction or strain be removed therefrom before the candles are drawn or ejected from such molds in a vertical direction, substantially as herein described and set forth.

2. The stretching or straining of the candle-wick in each and every of the vertical stationary candle-molds contained in the candle-mold machine at and by one continued or simultaneous operation, when the said wick extends from spools or bobbins below said molds upward, into, and through the center thereof, and from the lower or tip end of such molds to and into the candles suspended above such mold, substantially as herein described and set forth.

3. The employment of the candle-tip bar F, or any substantial equivalent therefor, which shall be so constructed and arranged as to be moved in a lateral direction up to, or against, or under the tips of the candles drawn or ejected from the stationary candle-molds below, and thereby come in contact with the tips of the said candles in such manner as to center the candle wick in the said molds and at the same time hold the said candles thus suspended during the operation of filling the said molds with melted material from which to mold candles, and during the cooling thereof and until the wick is cut or severed between the said suspended and molded candles in said stationary candle-molds, substantially as herein described and set forth.

4. A vertical stationary candle-mold constructed with an inner and annular shoulder, *h'*, and with an outer surrounding shoulder, *c*, and with a screw and nut at or near the lower end thereof, in the manner and for the purposes substantially as herein described and set forth.

5. The contraction of the lower end of the vertical stationary candle-molds so as to form an inner annular shoulder, in the manner and for the purposes substantially as herein described and set forth.

6. The mode, substantially as herein described and set forth, for attaching to and combined with the lower end of the vertical stationary candle-molds having an outer surrounding shoulder, *c*, and the bottom plate, B'', of the surrounding water-box, so as to make the same water-tight and firm therein, in the manner and for the purposes substantially as herein described and set forth.

7. The employment of the shovel-blade cutter J or any equivalent therefor, and the passing of the same between two rows of the wicks, of the vertically-suspended candles, so as to cut or sever the two rows of the said wicks in the manner and for the purposes substantially as herein described and set forth.

In testimony whereof I have, on this 11th day of December, A. D. 1865, hereunto set my hand.

WILLIS HUMISTON.

Witnesses:
CHARLES D. KELLUM,
R. H. REILLE.